(12) United States Patent  
Bethard

(10) Patent No.: US 7,890,673 B2
(45) Date of Patent: Feb. 15, 2011

(54) SYSTEM AND METHOD FOR ACCESSING NON PROCESSOR-ADDRESSABLE MEMORY

(75) Inventor: Roger A. Bethard, Chippewa Falls, WI (US)

(73) Assignee: Cray Inc., Seattle, WA (US)

( * ) Notice: Subject to any disclaimer, the term of this patent is extended or adjusted under 35 U.S.C. 154(b) by 650 days.

(21) Appl. No.: 11/611,092

(22) Filed: Dec. 14, 2006

(65) Prior Publication Data
US 2007/0088932 A1 Apr. 19, 2007

Related U.S. Application Data

(62) Division of application No. 10/037,479, filed on Oct. 24, 2001, now Pat. No. 7,162,608.

(51) Int. Cl.
G06F 13/00 (2006.01)
(52) U.S. Cl. .............. 710/33; 710/22; 710/24; 710/52; 711/165; 711/109; 711/206; 711/207
(58) Field of Classification Search ............. 710/33, 710/22, 24, 52; 711/165, 109, 206, 207
See application file for complete search history.

(56) References Cited

U.S. PATENT DOCUMENTS

| 4,513,367 | A | | 4/1985 | Chan et al. | |
|---|---|---|---|---|---|
| 4,679,166 | A | * | 7/1987 | Berger et al. | 713/2 |
| 5,193,166 | A | | 3/1993 | Menasce | |
| 5,255,384 | A | | 10/1993 | Sachs et al. | |
| 5,301,287 | A | | 4/1994 | Herrell et al. | |
| 5,581,705 | A | * | 12/1996 | Passint et al. | 709/200 |
| 5,584,039 | A | * | 12/1996 | Johnson et al. | 710/6 |
| 5,784,706 | A | | 7/1998 | Oberlin et al. | |
| 5,802,398 | A | * | 9/1998 | Liu et al. | 710/62 |
| 5,860,025 | A | | 1/1999 | Roberts et al. | |
| 5,860,110 | A | | 1/1999 | Fukui et al. | |
| 5,900,023 | A | * | 5/1999 | Pase | 711/220 |
| 5,928,353 | A | | 7/1999 | Yamada | |
| 6,157,398 | A | * | 12/2000 | Jeddeloh | 345/532 |
| 6,182,195 | B1 | | 1/2001 | Laudon et al. | |

(Continued)

FOREIGN PATENT DOCUMENTS

EP 0766177 A1 4/1997

OTHER PUBLICATIONS

Morris M Mano, Computer System Architecture, Prentice-Hall, 1976, pp. 460-461.*

(Continued)

Primary Examiner—Hong Kim
(74) Attorney, Agent, or Firm—Schwegman, Lundberg & Woessner, P.A.

(57) ABSTRACT

A system and method for addressing memory and transferring data, which in some embodiments include one or more processor translation look-aside buffers (TLBs) and optionally one or more I/O TLBs, and/or a block transfer engine (BTE) that optionally includes a serial cabinet-to-cabinet communications path (MLINK). In some embodiments, the processor TLBs are located within one or more common memory sections, each memory section being connected to a plurality of processors, wherein each processor TLB is associated with one of the processors. The BTE performs efficient memory-to-memory data transfers without further processor intervention. The MLINK extends the BTE functionality beyond a single cabinet.

23 Claims, 8 Drawing Sheets

U.S. PATENT DOCUMENTS

| | | | |
|---|---|---|---|
| 6,226,695 | B1 | 5/2001 | Kaiser et al. |
| 6,229,727 | B1 * | 5/2001 | Doyle .......................... 365/63 |
| 6,240,500 | B1 * | 5/2001 | Scales ........................ 711/202 |
| 6,256,683 | B1 * | 7/2001 | Barry .......................... 710/26 |
| 6,260,131 | B1 | 7/2001 | Kikuta |
| 6,370,632 | B1 | 4/2002 | Kikuta et al. |
| 6,470,441 | B1 * | 10/2002 | Pechanek et al. .............. 712/15 |
| 6,490,671 | B1 | 12/2002 | Frank et al. |
| 6,496,902 | B1 | 12/2002 | Faanes et al. |
| 6,629,207 | B1 | 9/2003 | Yoshioka et al. |
| 6,686,920 | B1 | 2/2004 | Peck, Jr. et al. |
| 6,763,327 | B1 | 7/2004 | Songer et al. |
| 6,779,085 | B2 | 8/2004 | Chauvel |
| 6,813,697 | B1 * | 11/2004 | Tomonaga et al. .......... 711/170 |
| 6,859,861 | B1 | 2/2005 | Rhodes |
| 7,162,608 | B2 | 1/2007 | Bethard |
| 7,177,530 | B1 * | 2/2007 | Suzuka ....................... 386/124 |
| 7,234,027 | B2 | 6/2007 | Kohn et al. |
| 2001/0049742 | A1 | 12/2001 | Steely, Jr. et al. |
| 2002/0144061 | A1 | 10/2002 | Faanes et al. |
| 2002/0169938 | A1 | 11/2002 | Scott et al. |
| 2009/0024883 | A1 | 1/2009 | Bethard |

OTHER PUBLICATIONS

Brandt, M., et al., *The Benchmarker's Guide for CRAY SV1 Systems*, Cray Inc.,(Jul. 20, 2000),p. 1-39.

Teller, P. J., et al., "Locating Multiprocessor TLBs at Memory", *Proceedings of the Twenty-Seventh Hawaii Internation Conference on Wailea*, vol. I, IEEE Computer Society,(Jan. 4, 1994),554-563.

"European Application Serial No. 10011354.7, Extended European Search Report mailed Dec. 8, 2010", 9 pgs.

Teller, P J, et al., "Locating Multiprocessor TLBs at Memory", System Sciences, 1994. vol. I : Architecture, Proceedings Of The Twenty-Seventh Hawaii International Conference On Wailea, Hi, USA Jan. 4-7, 1994, Los Alamitos, CA, USA, IEEE Comput. Soc. (Jan. 4, 1994), 554-563.

* cited by examiner

SYSTEM AND METHOD FOR ACCESSING NON PROCESSOR-ADDRESSABLE MEMORY

RELATED INVENTIONS

This application is a divisional under 37 C.F.R. 1.53(b) of U.S. Ser. No. 10/037,479 filed Oct. 24, 2001 (now U.S. Pat. No. 7,162,608, issued Jan. 9, 2007), which is incorporated herein by reference and made a part hereof.

The present invention is related to co-pending application Ser. No. 10/045,591 filed Oct. 24, 2001 (now U.S. Pat. No. 7,234,027, issued Jun. 19, 2007), entitled "INSTRUCTIONS FOR TEST & SET WITH SELECTIVELY ENABLED CACHE INVALIDATE".

FIELD OF THE INVENTION

The present invention is related to memory management, and more particularly to the addressing of memory and transferring of data in an information-handling system.

BACKGROUND

Memory management systems allow users to address memory via processing elements, and also allow access to solid-state disc data via I/O devices. Often, the user-data and solid-state disc portions of memory are segmented and separated, so that each much be addressed and accessed in separate operations. Because solid-state disc data occupies non processor-addressable memory space, users cannot address or manipulate this data via the direct control of processing elements.

For the reasons stated above, and for other reasons stated below which will become apparent to those skilled in the art upon reading and understanding the present specification, there is a need for a multi-processing element and multi-memory section information-handling system, such that a user can access non processor-addressable memory space (including solid-state disc data) via multiple processing elements.

SUMMARY OF THE INVENTION

A system and method for addressing memory and transferring data, which in some embodiments include one or more processor translation look-aside buffers (TLBs) and optionally one or more I/O TLBs, and/or a block transfer engine (BTE) that optionally includes a serial cabinet-to-cabinet communications path (MLINK). In some embodiments, the processor TLBs are located within one or more common memory sections, each memory section being connected to a plurality of processors, wherein each processor TLB is associated with one of the processors. The BTE performs efficient memory-to-memory data transfers without further processor intervention. The MLINK extends the BTE functionality beyond a single cabinet.

One aspect of the present invention provides an information-handling system, and an associated method. This system includes a plurality of processing elements, and one or more memory sections, wherein each memory section includes a memory array having a plurality of locations, a memory interface operatively connecting the memory array to each of the processing elements, and a plurality of processor translation look-aside buffers, wherein each processor translation look-aside buffer is operatively coupled to the memory array and to one of the processing elements in order to translate addresses received from the processing elements, and wherein each processor translation look-aside buffer has a plurality of entries, each one of the plurality of entries being used to map a processor address into a memory array address of the memory array.

Another aspect of the present invention provides an information-handling system that includes a plurality of processing elements, and a memory having a first memory section, wherein the first memory section is operatively coupled to each processing element. The first memory section includes a memory array, a memory interface operatively connecting the memory array to each of the processing elements, and a block transfer engine operatively coupled to the memory array, wherein the block transfer engine operates under command of one of the processing elements to transfer data from a memory location that cannot be addressed by the processing element to a memory location that can be addressed by the processing element.

Another aspect of the present invention provides a system that includes a first information-handling system, a second information-handling system, and a communications channel. The first information-handling system includes a plurality of first processing elements, and a first memory section, wherein the first memory section is operatively coupled to each of the first processing elements, and wherein the first memory section includes a first memory array, a first memory interface associated with the first memory array, and a first block transfer engine operatively coupled to the first memory array, wherein the first block transfer engine is associated with each of the first processing elements through the first memory interface. The second information-handling system includes a plurality of second processing elements, and a second memory section, wherein the second memory section is operatively coupled to each of the second processing elements, and wherein the second memory section includes a second memory array, a second memory interface associated with the second memory array, and a second block transfer engine operatively coupled to the second memory array, wherein the second block transfer engine is associated with each of the second processing elements through the second memory interface. The communications channel connects the first and second information-handling systems, wherein the second block transfer engine transfers an amount of data from a first memory address in the second memory array to a second memory address in the first memory array over the communications channel.

BRIEF DESCRIPTION OF THE DRAWINGS

In the following drawings, where the same number reflects similar function in each of the drawings.

DESCRIPTION OF THE PREFERRED EMBODIMENTS

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

Figure 1:
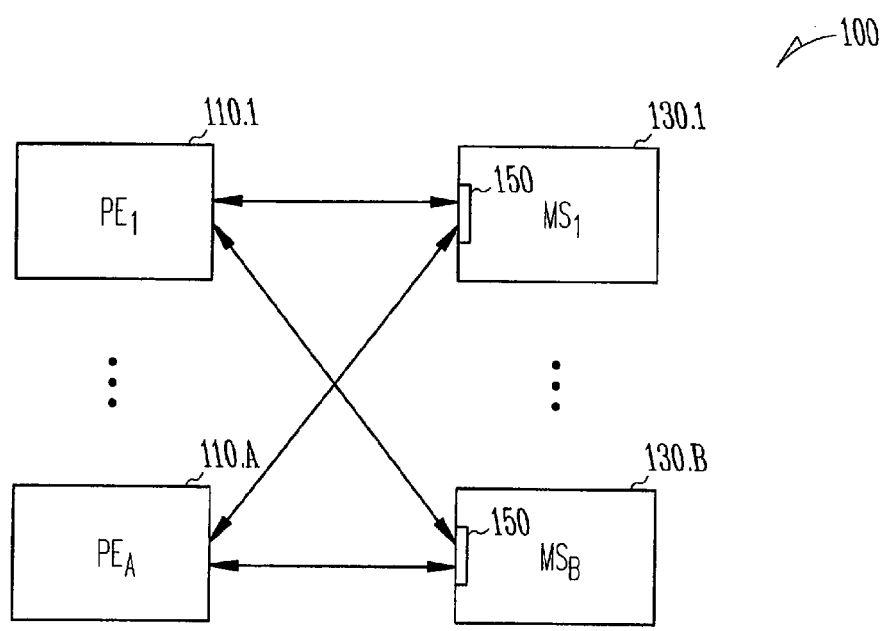
FIG. 1 is a block diagram illustrating a multi-processing element and multi-memory section information-handling system.

FIG. 1 is a block diagram illustrating an information-handling system. Information-handling system 100 is any system capable of processing information control commands, including data access and storage commands. Information-handling system 100 includes processing elements 110.1 through 110.A, where A is greater than one. Information-handling system 100 also includes memory sections 130.1 through 130.B, where B is greater than or equal to one. B does not necessarily equal A, so that there may be a different number of memory sections than processing elements. Each of the processing elements 110.1 through 110.A is operatively coupled to each of the memory sections 130.1 through 130.B through a memory interface 150. Each processing element is capable of sending and receiving commands and data. Each memory section is also capable of sending and receiving commands and data.

In some embodiments, each processing element 110 is implemented as a vector processor such as described in application Ser. No. 10/045,591 entitled "INSTRUCTIONS FOR TEST & SET WITH SELECTIVELY ENABLED CACHE INVALIDATE" filed on Oct. 24, 2001, and issued on Jun. 19, 2007, as U.S. Pat. No. 7,234,027, which is incorporated in its entirety by reference. Further details regarding various embodiments of processors 110 can be found in U.S. Pat. Nos. 4,128,880, 5,349,677, 5,434,970, 5,526,487 and 5,623,685 each of which is incorporated by reference.

In one embodiment, A and B are both equal to 8. That is, information-handling system 100 has 8 processing elements 110 and 8 memory sections 130, such that each processing element 110 is operatively coupled to each of the 8 memory sections 130.

Figure 2:
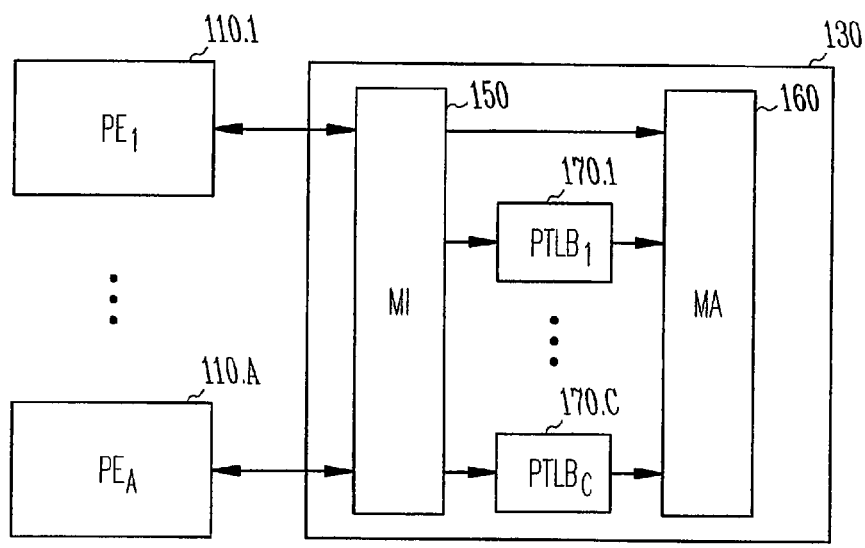
FIGS. 2-3 are block diagrams illustrating expanded views of the information-handling system of FIG. 1, showing memory sections with processor and I/O translation look-aside buffers.

FIG. 2 is a block diagram illustrating an expanded view of information-handling system 100 in one embodiment of the present invention. In this embodiment, memory section 130 includes memory interface 150, memory array 160, and processor translation look-aside buffers 170.1 through 170.C, where C is greater than 1. Memory interface 150 is operatively connected to memory array 160 in order to transfer data to and from locations within memory array 160. Memory interface 150 processes commands received from processing elements 110.1 through 110.A throughout memory section 130. Each of the processor translation look-aside buffers 170 is operatively coupled to memory array 160, and each can map processor addresses from C or more processing elements 110 into memory array addresses of memory array 160 (as detailed below in the description of FIG. 4).

In one implementation, A and C are both equal to 8. In this implementation, there is one processor translation look-aside buffer 170 associated with each one of the processing elements 110.

Figure 3:
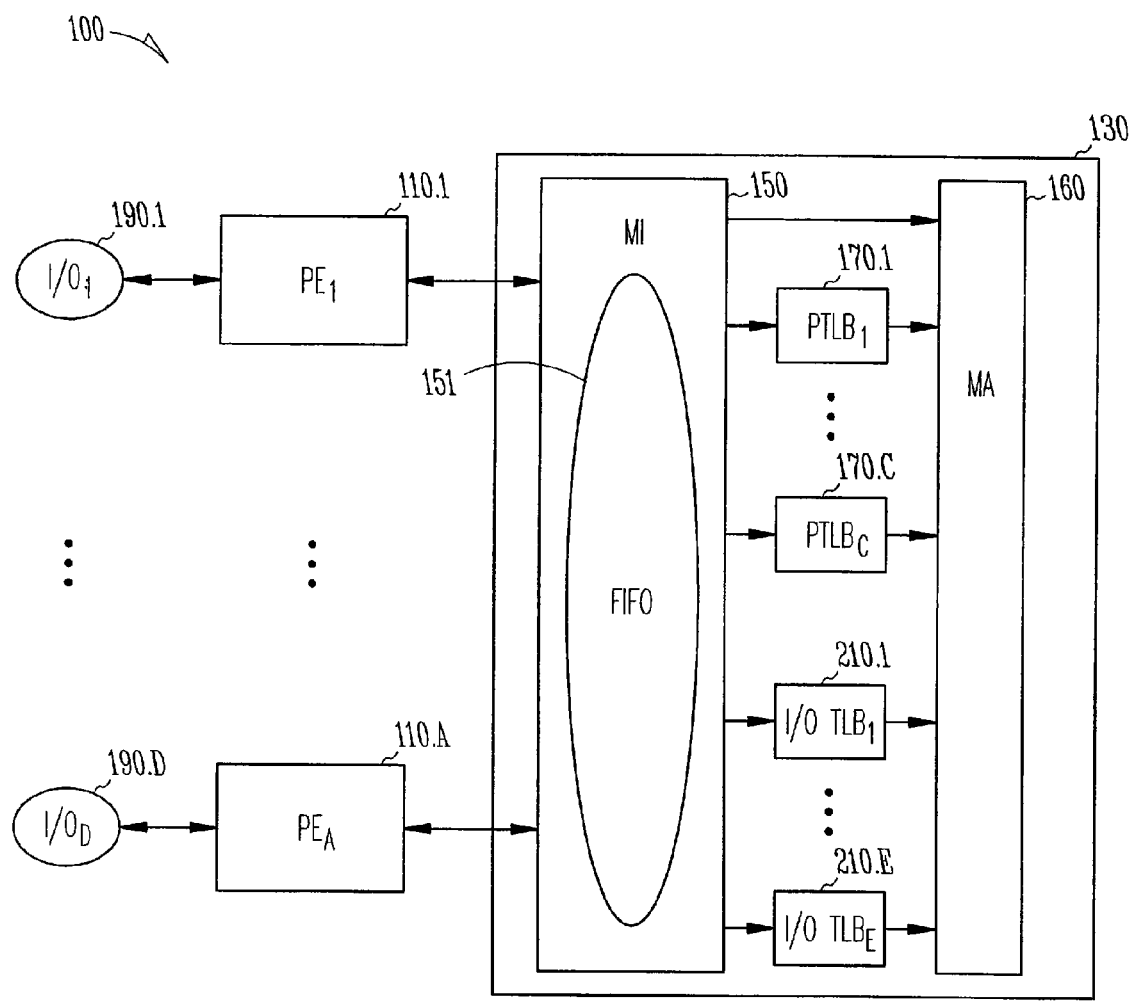

FIG. 3 is a block diagram illustrating an expanded view of information-handling system 100 in another embodiment of the present invention. In this embodiment, one or more input/output devices 190 are operatively coupled to one or more processing elements 110. In the embodiment shown, D is greater than one but D is not necessarily equal to A. Memory section 130 includes processor translation look-aside buffers $PTLB_1$ through $PTLB_C$, and further includes input/output translation look-aside buffers 210 ($I/OTLB_1$ through $I/OTLB_E$), where E is greater than or equal to one. Each of $I/OTLB_1$ through $I/OTLB_E$ is operatively coupled to memory array 160, and each can map I/O addresses from input/output devices $I/O_1$ through $I/O_D$ into memory array addresses of memory array 160 (as detailed below in the description of FIG. 4). FIG. 3 also shows FIFO 151 as part of memory interface 150. FIFO 151 accepts memory commands from one or more of the processing elements $PE_1$ through $PE_A$ and processes them on a first-in, first-out basis.

In one implementation, A is equal to 8, D is equal to 2, C is equal to 8, and E is equal to 2. In this implementation, there is one processor translation look-aside buffer 170 is associated with one of the processing elements 110, and one I/O translation look-aside buffer 210 is associated with each of the I/O devices. In another embodiment, one I/O translation look-aside buffer 210 maps addresses from two or more I/O devices 190 into memory addresses of memory array 160.

Figure 4:
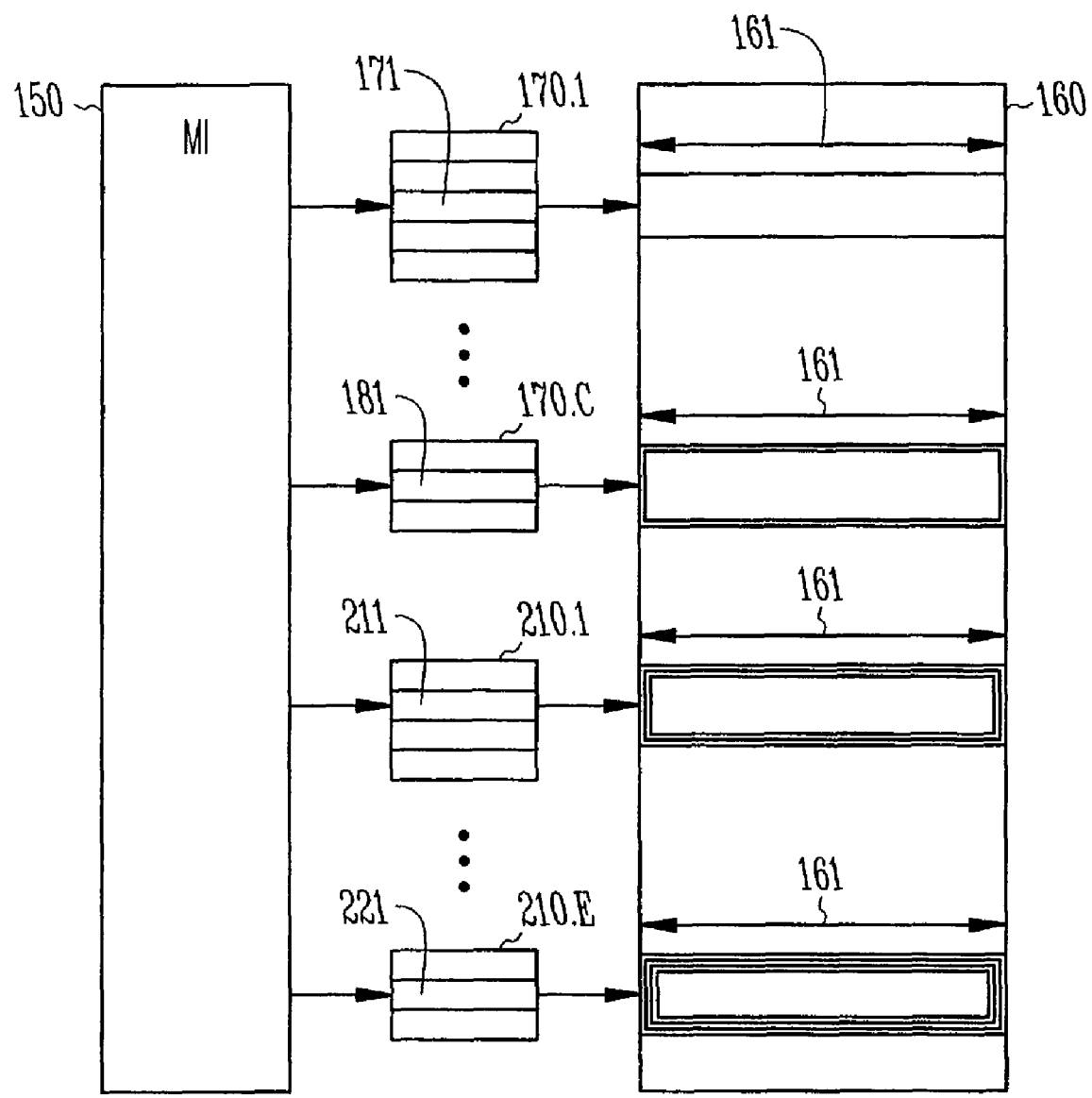
FIG. 4 is a block diagram illustrating mapping functionality of the processor and I/O translation look-aside buffers.

FIG. 4 is a block diagram illustrating mapping functionality of the processor and I/O translation look-aside buffers 170 and 210. In one embodiment, memory interface 150 routes a first memory command to $PTLB_1$ 170.1. The first memory command includes a first processor address. $PTLB_1$ 170 includes a first entry that maps the first processor address into a first memory array address 171 of memory array 160 using a first mapping function. In this fashion, $PTLB_1$ 170 addresses a first block of data at first memory array address 171, which has a TLB block length 161. Memory interface 150 also routes a second memory command to $PTLB_C$ 170.C. The second memory command includes a second processor address. $PTLB_C$ 170.C includes a second entry that maps the second processor address into a second memory array address 181 of memory array 160 using a second mapping function. In this fashion, $PTLB_C$ 170.C addresses a second block of data at second memory array address 181, which also has a TLB block length 161.

In some embodiments, memory interface 150 routes a third memory command to $I/OTLB_1$ 210.1. The third memory command includes a first I/O address. $I/OTLB_1$ 210 includes a third entry that maps the first I/O address into a third memory array address 211 of memory array 160 using a third mapping function. In this fashion, $I/OTLB_1$ 210 addresses a third block of data at third memory array address 211, which has a TLB block length 161. In other embodiments, memory interface 150 routes a fourth memory command to $I/OTLB_E$ 210.E. The fourth memory command includes a second I/O address. $I/OTLB_E$ 210.E includes a fourth entry that maps the second I/O address into a fourth memory array address 221 of memory array 160 using a fourth mapping function. In this fashion, $I/OTLB_E$ 210.E addresses a fourth block of data at fourth memory array address 221, which has a TLB block length 161. One or more of the blocks of data may overlap.

In one embodiment, the TLB block length 161 is equal to 8 Megawords, where 1 word is equal to 8 bytes. There are 8 processing elements that are each coupled to an individual memory section. The individual memory section includes 8 processor translation look-aside buffers, each corresponding to a processing element. In one such embodiment, a processor address from any one of the processing elements consists of 32 bits: 23 low order bits, and 9 high order bits. Each processor translation look-aside buffer maps only the 9 high order bits into a memory array address that consists of 13 high order bits, to address a TLB block of data. The 23 low order bits remain unchanged, and are used to address an individual word in the TLB block of data. Each processor translation look-aside buffer has 512 ($2^9$) entries, and there are 8192 ($2^{13}$) TLB blocks of data in memory array 160, each TLB block having a TLB block length of 8 Megawords ($2^{23}$) of data.

In one embodiment, the TLB blocks include user-data and solid-state disc (SSD) data. User-data is processor-addressable memory data, and SSD data is non processor-addressable memory data. If each of the 8 processor translation look-aside buffers contain identical mapping entries, there will be a minimum of 512 TLB blocks of user-data. If each of the 8 processor translation look-aside buffers contain different and unique mapping entries, there will be a maximum of 4096 (512×8) TLB blocks of user-data. Therefore, there will also be a minimum of 4096 TLB blocks of SSD data, and a maximum of 7680 TLB blocks of SSD data. Other bit combinations could be used as well. In addition, the bits used to address a TLB block of data may be dispersed across the processor address.

Figure 5:
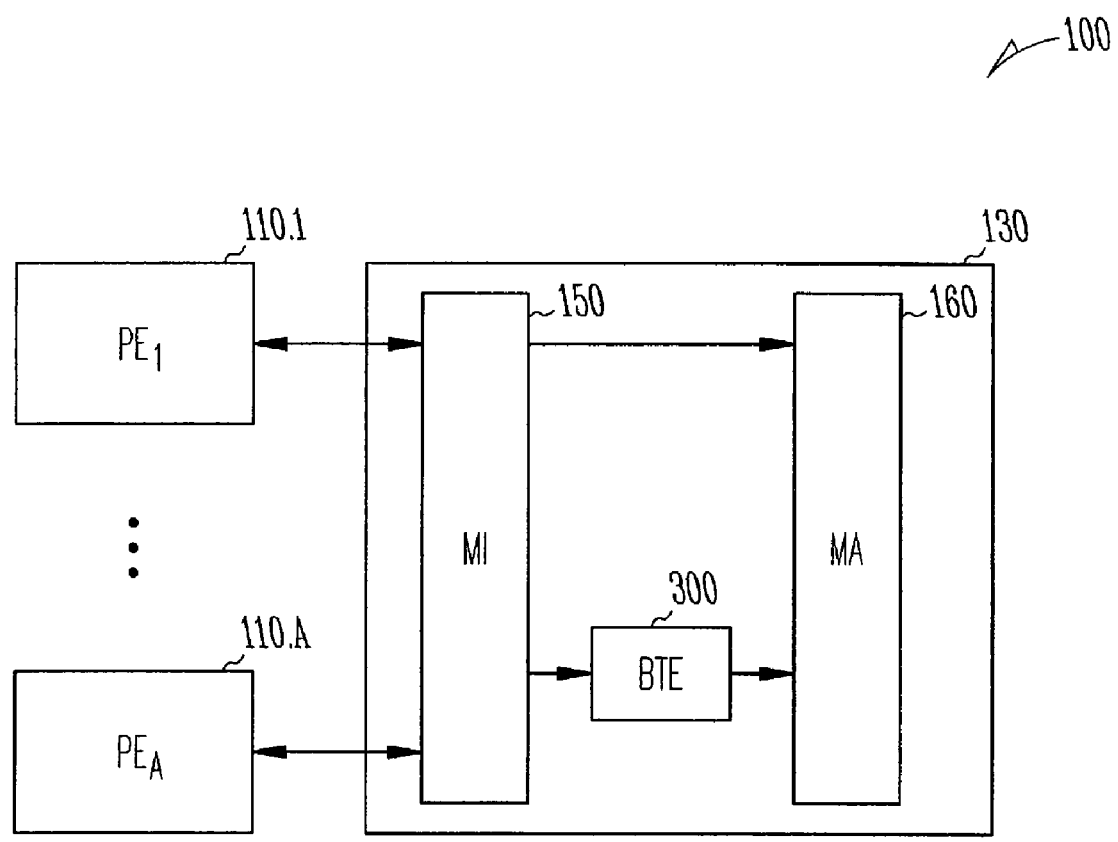
FIG. 5 is a block diagram illustrating a memory section containing a block transfer engine.

FIG. 5 is a block diagram illustrating a memory section containing a block-transfer engine in another embodiment of the current invention. In this embodiment, information-handling system 100 includes memory section 130 and processing elements $PE_1$ through $PE_4$, where each of the processing elements is operatively coupled to memory section 130 via memory interface 150. Memory section 130 also contains memory array 160, and block transfer engine 300. Memory interface 150 and block transfer engine 300 are operatively coupled to memory array 160. Processing elements $PE_1$ through $PE_4$ send block transfer commands to block transfer engine 300 through memory interface 150. As will be discussed further in the description of FIGS. 6 and 7, block transfer engine 300 transfers an amount of data from a non processor-addressable memory address in memory array 160 to a processor-addressable memory address in memory array 160.

Figure 6:
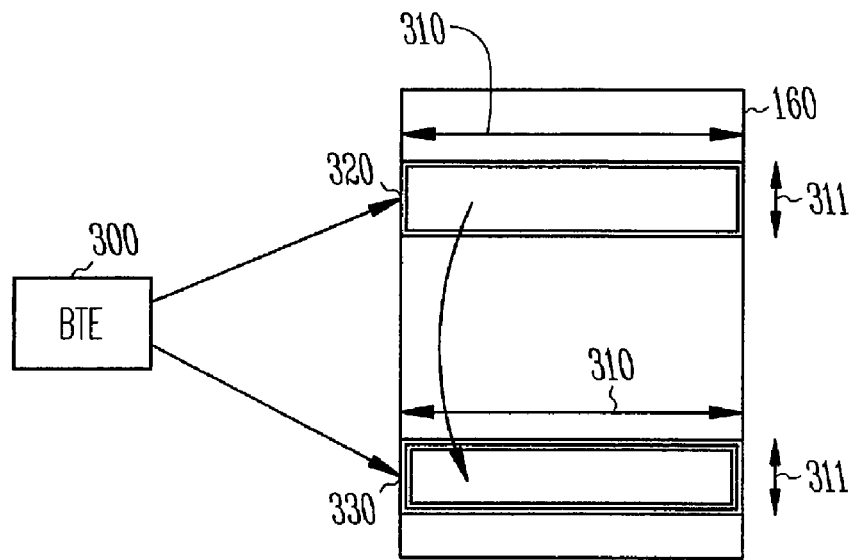
FIGS. 6-7 are block diagrams illustrating data transfer functionality of the block transfer engine.

FIG. 6 is a block diagram illustrating an embodiment of the data transfer functionality of block-transfer engine 300. As discussed earlier, processing elements $PE_1$ through $PE_4$ send block transfer commands to block transfer engine 300 through memory interface 150. An individual block transfer command includes a field for an amount of transfer data 311, a field for a source transfer address 320 in memory array 160, and a field for a destination transfer address 330 in memory array 160. In one embodiment, amount of transfer data 311 represents the number of BTE blocks of data (each having a BTE block length 310) that will be transferred. BTE block length 310 does not necessarily equal TLB block length 161 (described earlier). Source transfer address 320 is a non processor-addressable memory address, and destination transfer address 330 is a processor-addressable memory address. Block transfer engine processes the block transfer commands and transfers amount of transfer data 311 from source transfer address 320 to destination transfer address 330.

In one embodiment, the BTE block length 310 is equal to 512 words, where 1 word is equal to 8 bytes. A block transfer command consists of a 9 unused bit field, a 27 bit field for the source transfer address, a 27 bit field for the destination transfer address, and a 27 bit field for the amount of transfer data. Block transfer engine 300 is a memory-mapped register in memory section 130 that transfers blocks of data (each of size 512 words) in memory array 160. In one such embodiment, memory array 160 consists of user (processor-addressable) data blocks and solid-state disc (SSD, non processor-addressable) data blocks. Block transfer engine 300 therefore has the capability of transferring SSD data blocks to a processor-addressable destination transfer address within memory array 160. In this fashion, processing elements can access SSD data blocks.

Figure 7:
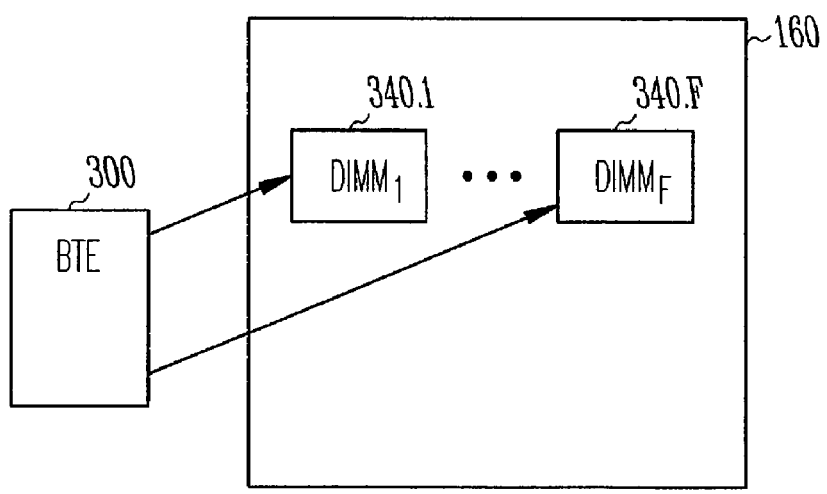

FIG. 7 shows an embodiment of the invention where memory array 160 contains $DIMM_1$ through $DIMM_F$. (A DIMM is a dual in-line memory module.) In this embodiment, block transfer engine 300 transfers data between DIMMs. FIG. 7 shows a transfer from $DIMM_1$ to $DIMM_F$, where the source transfer address resides on $DIMM_1$, and the destination transfer address resides on $DIMM_F$. In one implementation, F is equal to 32, such that there are 32 DIMMs per memory array 160. In other embodiments, block transfer engine 300 transfers data in a single DIMM (for example, in $DIMM_1$), such that the source transfer address and destination transfer address both reside on $DIMM_1$.

Figure 8:
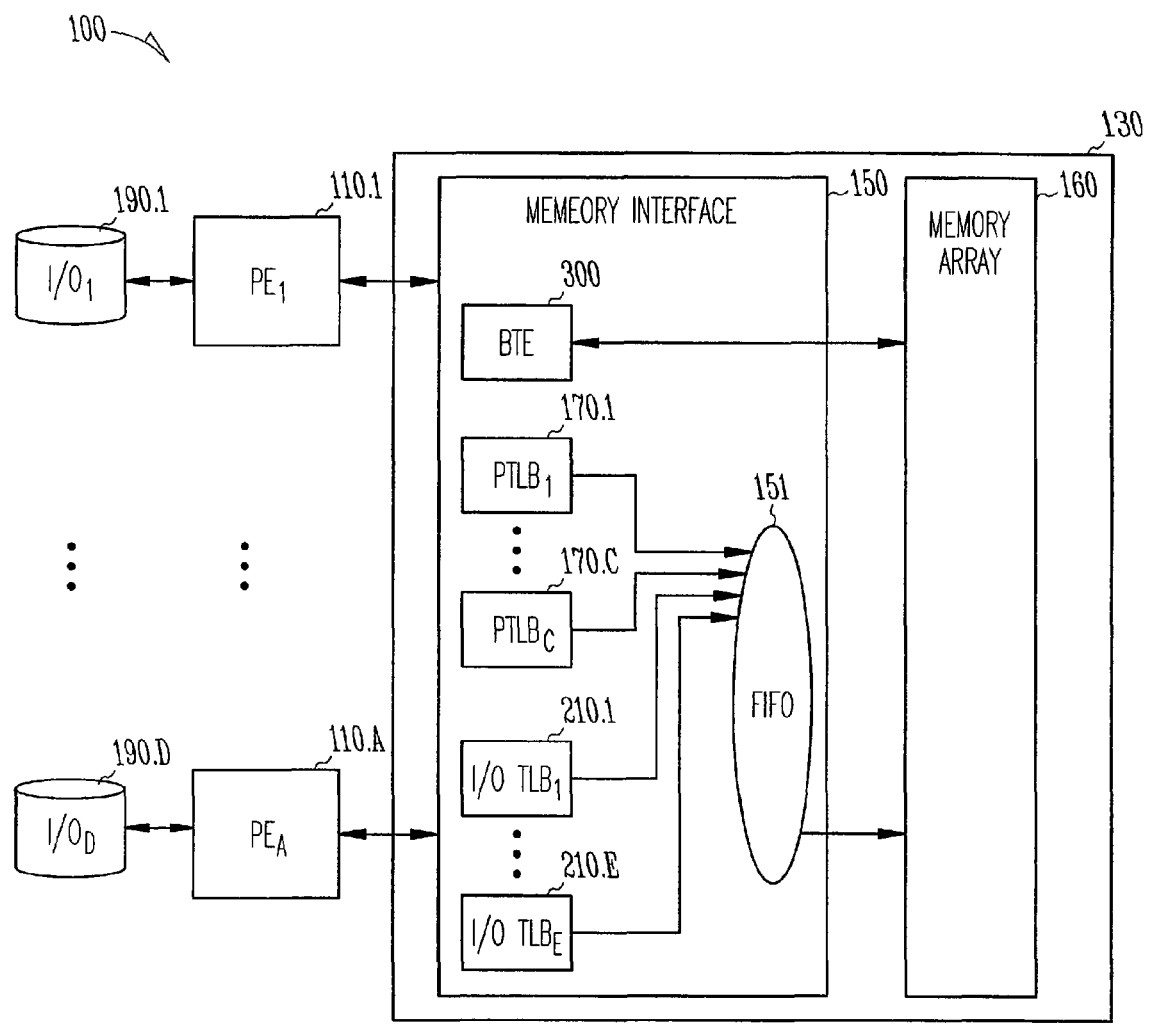
FIG. 8 is a block diagram illustrating I/O functionality, as well as a memory section containing a block transfer engine and translation look-aside buffers.

FIG. 8 shows another embodiment of the invention containing a block transfer engine. Memory section 130 includes memory array 160, memory interface 150, block transfer engine 300, processor translation look-aside buffers $PTLB_1$ through $PTLB_C$, and input/output translation look-aside buffers $I/OTLB_1$ through $I/OTLB_E$. Memory interface also includes FIFO 151. Input/output devices $I/O_1$ through $I/O_D$ are operatively coupled to processing elements $PE_1$ through $PE_A$. Processing elements $PE_1$ through $PE_A$ are operatively coupled to memory section 130 via memory interface 150. Block transfer engine 300 is operatively coupled to memory array 160, and processor translation look-aside buffers $PTLB_1$ through $PTLB_C$, and input/output translation look-aside buffers $I/OTLB_1$ through $I/OTLB_E$ are all operatively coupled to FIFO 151. In this embodiment, processor translation look-aside buffers $PTLB_1$ through $PTLB_C$ each map a processor address into a first memory array address of memory array 160, while input/output translation look-aside buffers $I/OTLB_1$ through $I/OTLB_E$ each map an I/O address into a second memory array address of memory array 160. The first and second memory array addresses of memory array 160 point to TLB blocks of data having a TLB block length. Block transfer engine 300 transfers data from a non processor-addressable memory address in memory array 160 to a processor-addressable memory address in memory array 160. The non processor-addressable memory address and processor-addressable memory address point to BTE blocks of data having a BTE block length. TLB block length and BTE block length are not necessarily equal. In one implementation, TLB block length is 8 Megawords (where 1 word equals 8 bytes), and BTE block length is 512 words. Processing elements 110 can, therefore, address a block of memory in memory array 160 either directly (by mapping a processor address to the block via one of the TLBs) or indirectly (by moving data from an inaccessible block to an accessible block via block transfer engine 300).

Figure 9:
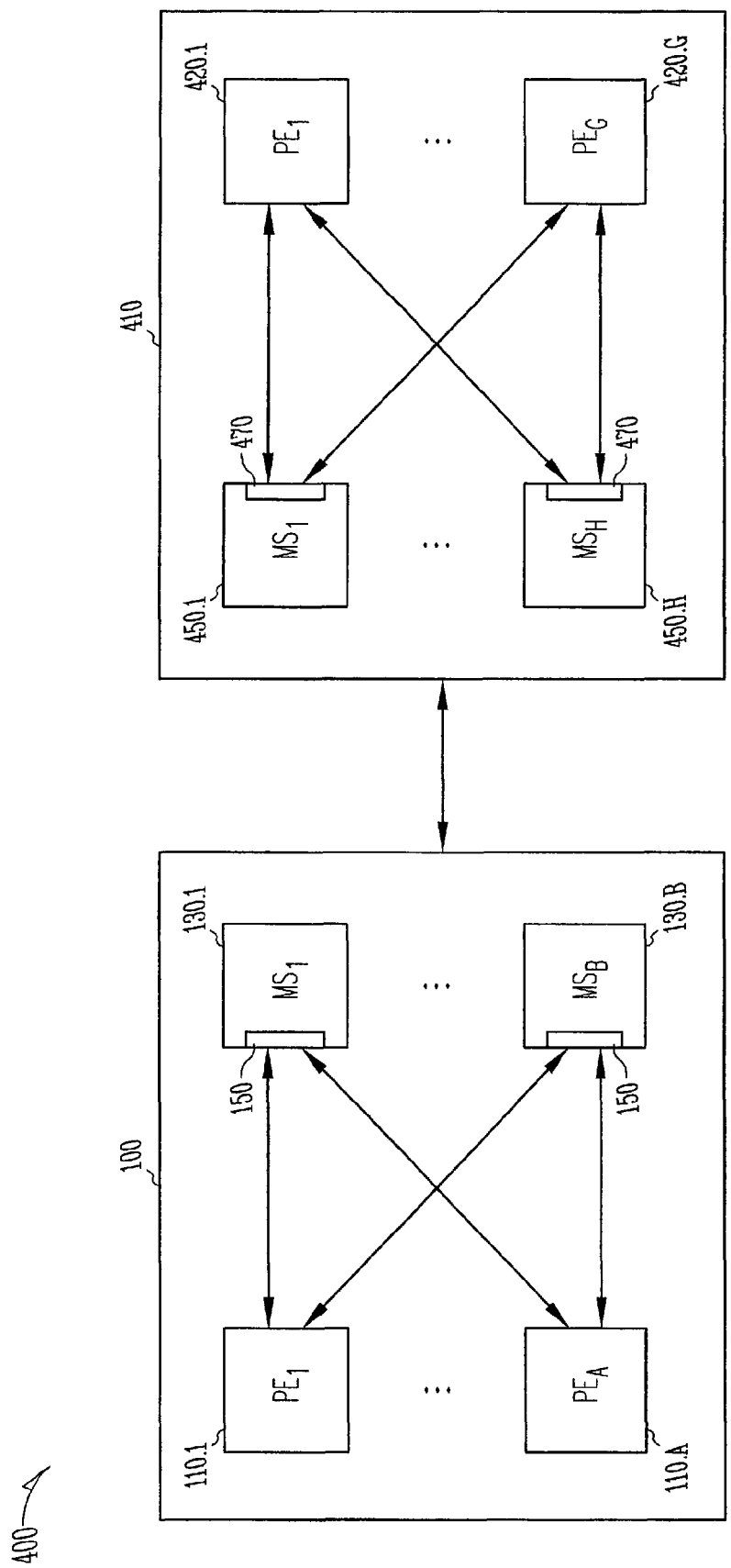
FIG. 9 is a block diagram illustrating a system of information-handling system components.

FIG. 9 is a block diagram illustrating a system of information-handling system components. System 400 includes first information-handling system 100 operatively coupled to second information-handling system 410. Information-handling system 100 includes processing elements $PE_1$ through $PE_A$ and memory sections $MS_1$ through $MS_B$, where each processing element is operatively coupled to each memory section. Information-handling system 410 includes processing elements PE$_1$ through PE$_G$ and memory sections MS$_1$ through MS$_H$, where each processing element is operatively coupled to each memory section.

Figure 10:
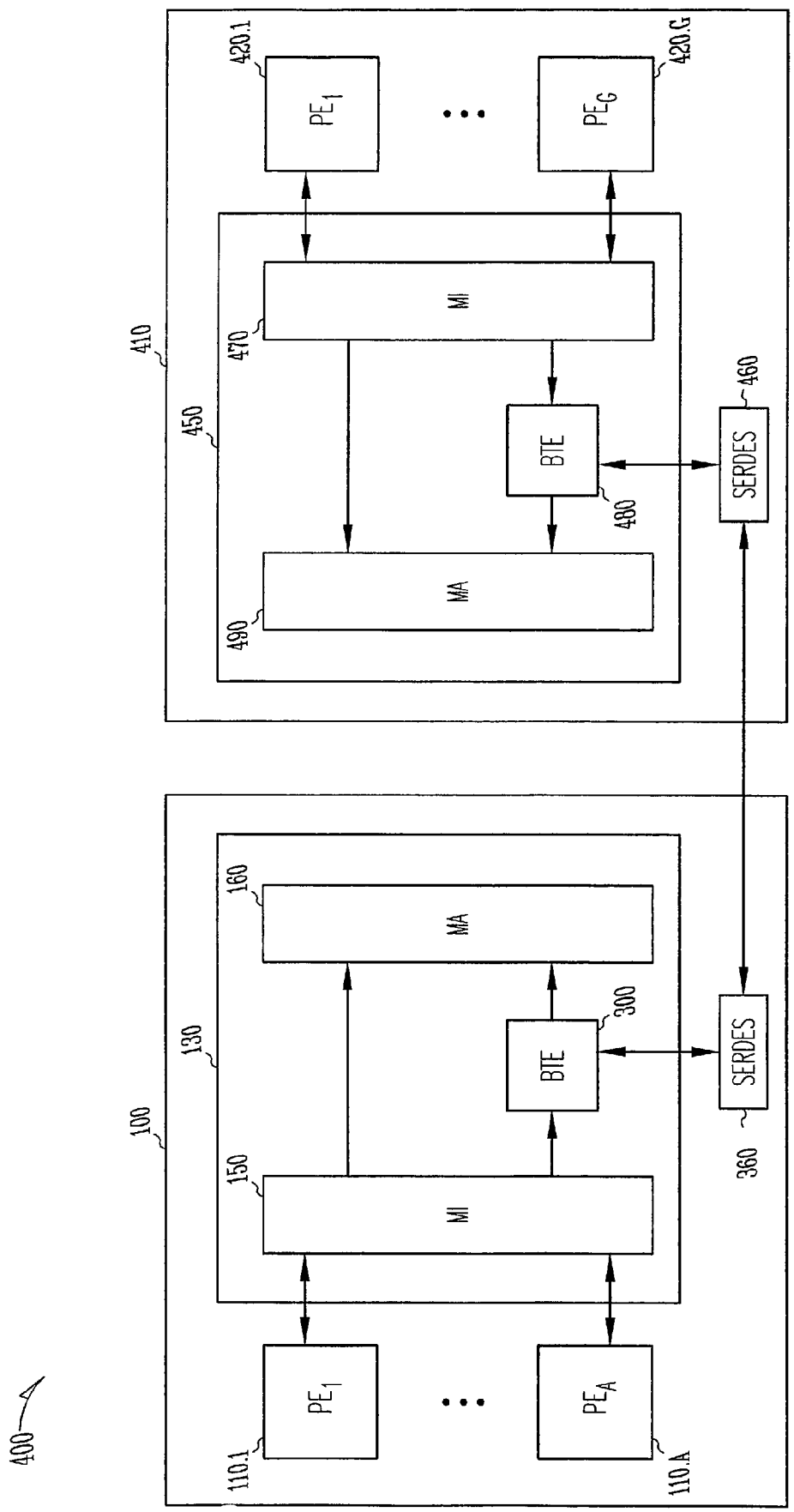
FIG. 10 is a block diagram illustrating data transfer functionality between the information-handling systems.

FIG. 10 is an expanded block diagram of FIG. 9 illustrating data transfer functionality between the information-handling systems for one embodiment of the present invention. First information-handling system 100 includes first memory section 130, first processing elements PE$_1$ through PE$_A$, and first SERDES (serializer-deserializer) 360. Each of the first processing elements PE$_1$ through PE$_A$ is operatively coupled to first memory section 130, and first SERDES 360 is also operatively coupled to first memory section 130. First memory section 130 includes first memory array 160, first memory interface 150, and first block transfer engine 300. First block transfer engine 300 is operatively coupled to first memory array 160 and also to SERDES 360. First block transfer engine 300 is also associated with each of the first processing elements PE$_1$ through PE$_A$ through first memory interface 150. Second information-handling system 410 includes second memory section 450, second processing elements PE$_1$ through PE$_G$, and second SERDES 460. Each of the second processing elements PE$_1$ through PE$_G$ is operatively coupled to second memory section 450, and second SERDES 460 is also operatively coupled to second memory section 450. Second memory section 450 includes second memory array 490, second memory interface 470, and second block transfer engine 480. Second block transfer engine 480 is operatively coupled to second memory array 490 and also to second SERDES 460. Second block transfer engine 480 is also associated with each of the second processing elements PE$_1$ through PE$_G$ through second memory interface 470. In a transfer operation, processing elements PE$_1$ through PE$_G$ send block transfer commands to block transfer engine 480 through memory interface 470. An individual block transfer command includes a field for an amount of transfer data, a source transfer address of second memory array 490 in second information-handling system 410, and a destination transfer address of first memory array 160 in first information-handling system 100. The amount of transfer data represents the number of BTE blocks of data (each having a BTE block length) that will be transferred. Second block transfer engine 480 transfers the BTE blocks of data from second memory array 490 to the second SERDES 460 of second information-handling system 410. The BTE blocks are then transferred to first SERDES 360 of first information-handling system 100, and to first block transfer engine 300. First block transfer engine 300 then transfers the BTE blocks to first memory array 160. First information-handling system 100 is also capable of transferring BTE blocks to second information-handling system 410 in a similar fashion.

In one embodiment, data is transferred between the first and second information-handling systems in BTE block lengths of 512 words (where 1 word equals 8 bytes). The source transfer address includes a 2 bit field that designates a source information-handling system, and the destination transfer address includes a 2 bit field that designates a destination information-handling system.

CONCLUSION

One aspect of the present invention provides an information-handling system (e.g. 100). This system includes a plurality of processing elements (e.g. 110.1 through 110.A), and one or more memory sections (e.g. 130), wherein each memory section 130 includes a memory array 160 having a plurality of locations, a memory interface 150 operatively connecting the memory array 160 to each of the processing elements 110.1 through 110.A, and a plurality of processor translation look-aside buffers 170.1 through 170.C, wherein each processor translation look-aside buffer (e.g. 170.1) is operatively coupled to the memory array 160 and to one of the processing elements (e.g. 110.1) in order to translate addresses received from the processing elements 110, and wherein each processor translation look-aside buffer 170 has a plurality of entries, each one of the plurality of entries being used to map a processor address into a memory array address of the memory array 160.

In some embodiments of this first system, the memory interface 150 includes a FIFO 151, wherein the FIFO 151 accepts memory commands from one or more of the processing elements 110 and transmits each of the memory commands to at least one of the processor translation look-aside buffers 170.

In some embodiments of this first system, the memory interface 150 includes a plurality of FIFOs, wherein each FIFO is associated with one of the processing elements 110, and wherein each FIFO accepts memory commands from its associated processing element 110 and transmits the memory commands to one of the processor translation look-aside buffers 170.

In some embodiments of this first system, the memory sections further include one or more I/O translation look-aside buffers (e.g. 210), wherein each I/O translation look-aside buffer 210 is operatively coupled to the memory array 160 and to one of the processing elements 110 to translate addresses received from the processing element 110, and wherein each of the I/O translation look-aside buffers 210 has a plurality of entries, each of the entries being used to map an I/O address into a memory array address of the memory array.

Another aspect of the present invention provides a method for addressing a memory within a memory system. This method includes routing a first memory command within the memory system, wherein the first memory command includes a first processor address, mapping the first processor address into a first memory address using a mapping function associated with a first processor, addressing memory data within the memory system with the first memory address, routing a second memory command within the memory system, wherein the second memory command includes a second processor address, mapping the second processor address into a second memory address using a mapping function associated with a second processor, and addressing memory data within the memory system with the second memory array address.

In some embodiments of this first method, the routing of the first memory command includes processing the first memory command on a first in first out basis with regard to other memory commands.

In some embodiments of this first method, the second processor is an I/O processor.

Another aspect of the present invention provides an information-handling system. This system includes a plurality of processing elements 110.1 through 110.A, and a memory having a first memory section 130, wherein the first memory section 130 is operatively coupled to each processing element. The first memory section 130 includes a memory array 160, a memory interface 150 operatively connecting the memory array to each of the processing elements, and a block transfer engine 300 operatively coupled to the memory array 160, wherein the block transfer engine 300 operates under command of one of the processing elements 110 to transfer data from a memory location that cannot be addressed by the processing element to a memory location that can be addressed by the processing element.

In some embodiments of this second system, the memory interface includes a FIFO 151, and the FIFO 151 accepts block transfer commands from one or more of the processing elements 110 and transmits the block transfer commands to the block transfer engine 300.

In some embodiments of this second system, the first memory section 130 further includes a processor translation look-aside buffer 170 associated with each processing element 110, and wherein each processor translation look-aside buffer 170 has a plurality of entries, each of the entries being used to map a processor address received from its associated processing element 110 into a memory array address within the memory array 160.

In some embodiments of this second system, the memory interface 150 includes a plurality of FIFOs, wherein each FIFO is associated with one of the processing elements 110, and wherein each FIFO accepts block transfer commands from its associated processing element 110 and transmits the block transfer commands to the block transfer engine 300.

In some embodiments of this second system, the first memory section 130 further includes a plurality of processor translation look-aside buffers 170.1 through 170.C that are each operatively coupled to the memory array 160, wherein each of the processor translation look-aside buffers 170 is associated with each of the processing elements 110, and wherein each of the processor translation look-aside buffers 170 has a first plurality of entries, each of the first plurality of entries being used to map a processor address into a first memory array address of the memory array 160.

In some embodiments of this second system, the memory further includes a second memory section, wherein the second memory section is operatively coupled to each processing element 110, and wherein the second memory section includes a memory array, a memory interface operatively connecting the memory array of the second memory section to each of the processing elements 110, and a block transfer engine operatively coupled to the memory array of the second memory section, wherein the block transfer engine of the second memory section operates under command of one of the processing elements 110 to transfer data from a memory location that cannot be addressed by the processing element to a memory location that can be addressed by the processing element.

In some embodiments of this second system, the first memory section further includes one or more I/O translation look-aside buffers 210.1 through 210.E, wherein each of the I/O translation look-aside buffers is operatively coupled to the memory array 160, wherein each of the I/O translation look-aside buffers is associated with a corresponding processing element 110, and wherein each of the I/O translation look-aside buffers has a second plurality of entries, each of the second plurality of entries being used to map an I/O address into a second memory array address of the memory array 160.

Another aspect of the present invention provides a method for transferring data in a memory. The method includes creating a block transfer command in a processor, wherein the block transfer command includes an amount of transfer data, a source transfer address, and a destination transfer address, wherein the source transfer address is a non processor-addressable memory address, and wherein the destination transfer address is a processor-addressable memory address, routing the block transfer command from the processor to the memory, and transferring the amount of transfer data from the source transfer address to the destination transfer address.

In some embodiments this second method, the routing of the block transfer command includes processing the block transfer command on a first in first out basis with regard to a plurality of other commands.

Another aspect of the present invention provides a system 400 that includes a first information-handling system 100, a second information-handling system 410, and a communications channel. The first information-handling system includes a plurality of first processing elements 110.1 through 110.A, and a first memory section 130, wherein the first memory section is operatively coupled to each of the first processing elements, and wherein the first memory section includes a first memory array 160, a first memory interface 150 associated with the first memory array, and a first block transfer engine 300 operatively coupled to the first memory array, wherein the first block transfer engine is associated with each of the first processing elements 110 through the first memory interface. The second information-handling system 410 includes a plurality of second processing elements 420.1 through 420.G, and a second memory section 450, wherein the second memory section is operatively coupled to each of the second processing elements, and wherein the second memory section includes a second memory array 490, a second memory interface 470 associated with the second memory array, and a second block transfer engine 480 operatively coupled to the second memory array, wherein the second block transfer engine is associated with each of the second processing elements 420 through the second memory interface. The communications channel connects the first and second information-handling systems, wherein the second block transfer engine 480 transfers an amount of data from a first memory address in the second memory array 490 to a second memory address in the first memory array 160 over the communications channel.

In some embodiments of this third system, the first information-handling system 100 further includes one or more further memory sections, each of the memory sections substantially equal to the first memory section.

In some embodiments of this third system, the second information-handling system 410 further includes one or more further memory sections, each of the memory sections substantially equal to the second memory section.

In some embodiments of this third system, the first memory interface 150 includes a FIFO, and wherein the FIFO accepts block transfer commands from one or more of the first processing elements 110 and transmits the block transfer commands to the first block transfer engine 300.

In some embodiments of this third system, the second memory interface 470 includes a FIFO, and wherein the FIFO accepts block transfer commands from one or more of the second processing elements 420 and transmits the block transfer commands to the second block transfer engine 480.

In some embodiments of this third system, the first memory section 130 of the first information-handling system 100 further includes a processor translation look-aside buffer associated with each of the plurality of first processing elements, and wherein each processor translation look-aside buffer has a plurality of entries, each of the entries being used to map a processor address received from its associated processing element into a memory array address within the first memory array.

Another aspect of the present invention provides a method for transferring data in a system. The method includes creating a block transfer command in a processor of a first information-handling system, wherein the block transfer command includes an amount of transfer data, a source transfer address, and a destination transfer address, wherein the source transfer address is a first memory address of a first memory of the first information-handling system, and wherein the destination transfer address is a second memory address of a second memory of a second information-handling system, routing the block transfer command from the processor to the first memory of the first information-handling system, and transferring the amount of transfer data from the source transfer address to the destination transfer address.

In some embodiments of this third method, the routing of the block transfer command includes processing the block transfer command on a first in first out basis with regard to a plurality of other commands.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. An information-handling system, comprising:
a plurality of processing elements; and
a memory having a first memory section, wherein the first memory section is operatively coupled to each processing element, and wherein the first memory section comprises:
a memory array having processor-addressable and non processor-addressable memory;
a memory interface operatively connecting the memory array to each of the processing elements; and
a block transfer engine operatively coupled to between the memory interface and the memory array, wherein the block transfer engine operates to receive a block transfer command from one of the processing elements and to transfer data from a first memory location in the non processor-addressable memory of the memory array to a second memory location in the processor-addressable memory of that memory array, wherein the first memory location can be accessed only indirectly by one or more of the plurality of processing elements via the block transfer engine and wherein the second memory location can be accessed directly by one or more of the plurality of processing elements using a processor address generated by a corresponding processing element;
wherein the memory interface includes one or more FIFOs, wherein the one or more FIFOs accept block transfer commands from one or more of the processing elements and transmit transmits the block transfer commands to the block transfer engine.

2. The information-handling system of claim 1, wherein the first memory section further includes a processor translation look-aside buffer associated with each processing element, and wherein each processor translation look-aside buffer has a plurality of entries, each of the entries being used to map a processor address received from its associated processing element into a memory array address within the memory array.

3. The information-handling system of claim 1, wherein each FIFO is associated with one of the processing elements, and wherein each FIFO accepts block transfer commands from its associated processing element and transmits the block transfer commands to the block transfer engine.

4. The information-handling system of claim 1, wherein the first and second memory location are in a dual in-line memory module (DIMM).

5. The information-handling system of claim 1, wherein the block transfer command comprises the first memory location, the second memory location and an amount of data to be transferred, wherein the first and second memory locations comprise memory addresses.

6. The information-handling system of claim 1, wherein the block transfer engine comprises a memory-mapped register.

7. An information-handling system, comprising:
a plurality of processing elements; and
a memory having a first memory section, wherein the first memory section is operatively coupled to each processing element, and wherein the first memory section comprises:
a memory array having processor-addressable and non processor-addressable memory;
a memory interface operatively connecting the memory array to each of the processing elements;
a block transfer engine operatively coupled between the memory interface and the memory array, wherein the block transfer engine operates to receive a block transfer command from one of the processing elements and to transfer data from a first memory location in the non processor-addressable memory of the memory array to a second memory location in the processor-addressable memory of that memory array, wherein the first memory location can be accessed only indirectly by one or more of the plurality of processing elements via the block transfer engine and wherein the second memory location can be accessed directly by one or more of the plurality of processing elements using a processor address generated by a corresponding processing element; and
a plurality of processor translation look-aside buffers that are each operatively coupled to the memory array, wherein each of the processor translation look-aside buffers is associated with each of the processing elements, and wherein each of the processor translation look-aside buffers has a first plurality of entries, each of the first plurality of entries being used to map a processor address into a first memory array address of the memory array.

8. The information-handling system of claim 7, wherein the memory further comprises a second memory section, wherein the second memory section is operatively coupled to each processing element, and wherein the second memory section comprises:
a memory array;
a memory interface operatively connecting the memory array of the second memory section to each of the processing elements; and
a block transfer engine operatively coupled to the memory array of the second memory section, wherein the block transfer engine of the second memory section operates under command of one of the processing elements to transfer data from a memory location that cannot be addressed by the processing element to a memory location that can be addressed by the processing element.

9. The information-handling system of claim 7, wherein the first memory section further includes one or more I/O translation look-aside buffers, wherein each of the I/O translation look-aside buffers is operatively coupled to the memory array, wherein each of the I/O translation look-aside buffers is associated with a corresponding processing element, and wherein each of the I/O translation look-aside buffers has a second plurality of entries, each of the second plurality of entries being used to map an I/O address into a second memory array address of the memory array.

10. A method for transferring data in a memory including a memory array, a block transfer engine and a memory interface, wherein the memory interface includes a FIFO, the method comprising:

creating a block transfer command in one of a plurality of processors, wherein the block transfer command includes an amount of transfer data, a source transfer address, and a destination transfer address, wherein the source transfer address is a first memory location in a non processor-addressable memory of the memory array and wherein the destination transfer address is a second memory location in a processor-addressable memory of that memory array, wherein the first memory location can be accessed only indirectly by one or more of the plurality of processors via the block transfer engine included in the memory and wherein the second memory location can be accessed directly by one or more of the plurality of processors using a processor address generated by a corresponding processor;

routing the block transfer command from the processor that generated the block transfer command to the memory, wherein the routing of the block transfer command includes receiving the bock transfer command in the FIFO, transmitting the block transfer command from the FIFO to the block transfer engine and processing the block transfer command in the block transfer engine; and transferring the amount of transfer data from the source transfer address to the destination transfer address.

11. The method of claim 10, wherein the first and second memory location are in a dual in-line memory module (DIMM).

12. An information-handling system comprising:
a memory including a memory array and a memory interface, wherein the memory array includes processor-addressable and non processor-addressable memory; and
a plurality of processing elements, wherein each of the processing elements is operatively coupled to the memory;
wherein the memory includes transferring means for transferring data from a first memory location in the non processor-addressable memory of the memory array to a second memory location in the processor-addressable memory of that memory array, wherein the first memory location can be accessed only indirectly by one or more of the plurality of processing elements via the transferring means and wherein the second memory location can be accessed directly by one or more of the plurality of processing elements using a processor address generated by a corresponding processing element; and
wherein the memory interface includes one or more FIFOs, and wherein the one or more FIFOs accept block transfer commands from one or more of the processing elements and transmit the block transfer commands to the transferring means.

13. The information-handling system of claim 12, wherein the first and second memory location are in a dual in-line memory module (DIMM).

14. A system comprising:
a first information-handling system, the first information-handling system comprising:
a plurality of first processing elements; and
a first memory section, wherein the first memory section is operatively coupled to each of the first processing elements, and wherein the first memory section comprises:
a first memory array having processor-addressable and non processor-addressable memory;
a first memory interface associated with the first memory array; and
a first block transfer engine operatively coupled between the first memory interface and the first memory array, wherein the first block transfer engine is associated with each of the first processing elements through the first memory interface and operates to receive a block transfer command from one of the first processing elements and to transfer data from a first memory location in the non processor-addressable memory of the first memory array to a second memory location in the processor-addressable memory of the first memory array, wherein the first memory location can be accessed only indirectly by one or more of the plurality of first processing elements via the first block transfer engine and the second memory location can be accessed directly by one or more of the plurality of first processing elements using a processor address generated by a corresponding first processing element;
wherein the first memory interface includes one or more FIFOs, and wherein the one or more FIFOs accept block transfer
commands from one or more of the plurality of first processing elements and
transmit the block transfer commands to the first block transfer engine;
a second information-handling system, the second information-handling system comprising:
a plurality of second processing elements; and
a second memory section, wherein the second memory section is operatively coupled to each of the second processing elements, and wherein the second memory section comprises:
a second memory array;
a second memory interface associated with the second memory array; and
a second block transfer engine operatively coupled to the second memory array, wherein the second block transfer engine is associated with each of the second processing elements through the second memory interface; and
a communications channel connecting the first and second information-handling systems;
wherein the second block transfer engine transfers an amount of data from a first memory address in the second memory array to a second memory address in the first memory array over the communications channel.

15. The system of claim 14, wherein the second memory interface includes a FIFO, and wherein the FIFO accepts block transfer commands from one or more of the second processing elements and transmits the block transfer commands to the second block transfer engine.

16. The system of claim 14, wherein the first and second memory location are in a dual in-line memory module (DIMM).

17. The system of claim 14, wherein the first information-handling system further comprises one or more further memory sections, each of the memory sections substantially equivalent to the first memory section.

18. The system of claim 14, wherein the second information-handling system further comprises one or more further memory sections, each of the memory sections substantially equivalent to the second memory section.

19. A system comprising:
a first information-handling system, the first information-handling system comprising:
a plurality of first processing elements; and
a first memory section, wherein the first memory section is operatively coupled to each of the first processing elements, and wherein the first memory section comprises:
a first memory array having processor-addressable and non processor-addressable memory;
a first memory interface associated with the first memory array;
a first block transfer engine operatively coupled between the first memory interface and the first memory array, wherein the first block transfer engine is associated with each of the first processing elements through the first memory interface and operates to receive a block transfer command from one of the first processing elements and to transfer data from a first memory location in the non processor-addressable memory of the first memory array to a second memory location in the processor-addressable memory of the first memory array, wherein the first memory location can be accessed only indirectly by one or more of the plurality of first processing elements via the first block transfer engine and the second memory location can be accessed directly by one or more of the plurality of first processing elements using a processor address generated by a corresponding first processing element; and
a processor translation look-aside buffer associated with each of the plurality of first processing elements, and wherein each processor translation look-aside buffer has a plurality of entries, each of the entries being used to map a processor address received from its associated processing element into a memory array address within the first memory array;
a second information-handling system, the second information-handling system comprising:
a plurality of second processing elements; and
a second memory section, wherein the second memory section is operatively coupled to each of the second processing elements, and wherein the second memory section comprises:
a second memory array;
a second memory interface associated with the second memory array; and
a second block transfer engine operatively coupled to the second memory array, wherein the second block transfer engine is associated with each of the plurality of second processing elements through the second memory interface; and
a communications channel connecting the first and second information-handling systems;
wherein the second block transfer engine transfers an amount of data from a first memory address in the second memory array to a second memory address in the first memory array over the communications channel.

20. A method for transferring data in a system including a first information-handling system and a second information-handling system, wherein the first and second information-handling system includes a first and second memory, respectively, wherein the first memory includes a first memory array, a first block transfer engine and a first memory interface, wherein the first memory interface includes a FIFO, the method comprising:
creating a first block transfer command in one of a plurality of first processors of the first information-handling system, wherein the first block transfer command includes a first amount of transfer data, a first source transfer address, and a first destination transfer address, wherein the first source transfer address is a first memory location in a non processor-addressable memory of the first memory array and wherein the first destination transfer address is a second memory location in a processor-addressable memory of the first memory array, wherein the first memory location can be accessed only indirectly by one or more of the plurality of first processors via the first block transfer engine included in the first memory and wherein the second memory location can be accessed directly by one or more of the plurality of first processors using a processor address generated by a corresponding first processor;
creating a second block transfer command in a second processor of the first information-handling system, wherein the second block transfer command includes a second amount of transfer data, a second source transfer address, and a second destination transfer address, wherein the second source transfer address is a third memory location of the first memory and wherein the second destination transfer address is a fourth memory location of the second memory;
routing at least one of the first and second block transfer command from corresponding processors that generated the block transfer command to the first memory of the first information-handling system, wherein the routing of the at least one of the first and second block transfer command includes receiving the at least one of the first and second bock transfer command in the FIFO, transmitting the at least one of the first and second block transfer command from the FIFO to the first block transfer engine and processing the at least one of the first and second block transfer command in the first block transfer engine on a first in first out basis with regard to a plurality of other commands; and
transferring the amount of transfer data indicated by the routed block transfer command from its corresponding source transfer address to its corresponding destination transfer address.

21. The method of claim 20, wherein the first and second memory location are in a dual in-line memory module (DIMM).

22. A system comprising:
a first information-handling system comprising a first memory and a plurality of first processing elements, wherein the first memory includes a first memory interface and a first memory array having processor-addressable and non processor-addressable memory and wherein each of the first processing elements is operatively coupled to the first memory;
a second information-handling system comprising a second memory and a plurality of second processing elements, wherein each of the second processing elements is operatively coupled to the second memory;
first means for transferring data from a first memory location of the first memory to a second memory location of the second memory; and second means for transferring data from a third memory location in the non processor-addressable memory of the first memory array to a fourth memory location in the processor-addressable memory of the first memory array, wherein the third memory location can be accessed only indirectly by one or more of the plurality of first processing elements via the means for transferring data and wherein the fourth memory location can be accessed directly by one or more of the plurality of first processing elements using a processor address generated by a corresponding first processing element;

wherein the first memory interface includes one or more FIFOs, wherein the one or more FIFOs accept block transfer commands from one or more of the plurality of first processing elements and transmit the block transfer commands to the first or second means.

23. The system of claim 22, wherein the first and second memory location are in a dual in-line memory module (DIMM).

* * * * *

UNITED STATES PATENT AND TRADEMARK OFFICE
CERTIFICATE OF CORRECTION

PATENT NO.        : 7,890,673 B2
APPLICATION NO.   : 11/611092
DATED             : February 15, 2011
INVENTOR(S)       : Roger A. Bethard Page 1 of 1

It is certified that error appears in the above-identified patent and that said Letters Patent is hereby corrected as shown below:

In column 11, line 35, in Claim 1, after "coupled" delete "to".

In column 11, line 53, in Claim 1, after "transmit" delete "transmits".

In column 13, line 27, in Claim 10, delete "bock" and insert -- block --, therefor.

In column 16, line 1, in Claim 20, delete "handing" and insert -- handling --, therefor.

In column 16, line 39, in Claim 20, delete "bock" and insert -- block --, therefor.

Signed and Sealed this
Nineteenth Day of April, 2011

David J. Kappos
*Director of the United States Patent and Trademark Office*